United States Patent
Widzinski et al.

(10) Patent No.: US 8,588,506 B2
(45) Date of Patent: Nov. 19, 2013

(54) IMAGE ALGORITHMS TO REJECT UNDESIRED IMAGE FEATURES

(75) Inventors: Thomas J. Widzinski, Rochester, NY (US); Erwin L. Allmann, Penfield, NY (US); Thomas D. Pawlik, Rochester, NY (US); Judith A. Bose, Webster, NY (US); Gary M. Spinelli, Hilton, NY (US); Myra T. Olm, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 357 days.

(21) Appl. No.: 13/094,931

(22) Filed: Apr. 27, 2011

(65) Prior Publication Data

US 2012/0275639 A1 Nov. 1, 2012

(51) Int. Cl.
*G06K 9/00* (2006.01)
(52) U.S. Cl.
USPC .......................................... 382/135; 382/219
(58) Field of Classification Search
USPC ......... 382/135, 137, 138, 139, 140, 218, 229; 235/375, 379, 383, 385; 705/35, 39, 705/45, 24, 64–79
See application file for complete search history.

(56) References Cited

U.S. PATENT DOCUMENTS

| | | | |
|---|---|---|---|
| 5,848,189 A * | 12/1998 | Pearson et al. ................ 382/218 |
| 2003/0116747 A1 | 6/2003 | Lem et al. |
| 2004/0000998 A1 | 1/2004 | Karp |
| 2007/0023521 A1 | 2/2007 | Wildey et al. |
| 2008/0298635 A1* | 12/2008 | West .............................. 382/101 |
| 2009/0218401 A1 | 9/2009 | Moran et al. |
| 2010/0025476 A1 | 2/2010 | Widzinski, Jr. et al. |

FOREIGN PATENT DOCUMENTS

WO  WO 02/50790 A1  6/2002
WO  WO 2010/071673  6/2010

* cited by examiner

*Primary Examiner* — Brian Le
(74) *Attorney, Agent, or Firm* — Nelson Adrian Blish

(57) ABSTRACT

A method for detecting authorized security markers includes capturing an image of a region of interest on a product with a camera; storing image data in a two-dimensional array on a microprocessor; counting a number of pixels at or above a predetermined brightness level in the image data with the microprocessor to determine a first score; eroding the image data; counting the pixels which remain at or above the predetermined brightness level after erosion to determine a second score; calculating a ratio of the second score to the first score; and producing a first authentication signal if the ratio meets a first predetermined criteria.

3 Claims, 8 Drawing Sheets

Figure 5

| 0 | 1 | 1 | 1 | 0 | 0 |
|---|---|---|---|---|---|
| 0 | 1 | 1 | 1 | 0 | 0 |
| 0 | 1 | 1 | 1 | 0 | 0 |

| 0 | 1 | 1 | 1 | 0 | 0 |
|---|---|---|---|---|---|
| 0 | 0 | 1 | 1 | 0 | 0 |
| 0 | 1 | 1 | 1 | 0 | 0 |

Figure 6

| 1 | 1 | 1 | 1 | 0 | 0 |
|---|---|---|---|---|---|
| 1 | 1 | 1 | 0 | 0 | 0 |
| 1 | 1 | 1 | 1 | 0 | 0 |

64 ← 66

| 1 | 1 | 1 | 1 | 0 | 0 |
|---|---|---|---|---|---|
| 1 | 1 | 1 | 0 | 0 | 0 |
| 1 | 1 | 1 | 1 | 0 | 0 |

62 ← 60

IMAGE ALGORITHMS TO REJECT UNDESIRED IMAGE FEATURES

CROSS REFERENCE TO RELATED APPLICATIONS

Reference is made to commonly-assigned U.S. patent application Ser. No. 13/094,920 (now U.S. Publication No. 2012/0274467), filed Apr. 27, 2011, entitled DEACTIVATION OF A SECURITY FEATURE, by Pawlik et al.; and U.S. patent application Ser. No. 13/094,945 (now U.S. Publication No. 2012/0275640), filed Apr. 27, 2011, entitled METHOD OF AUTHENTICATING SECURITY MARKER, by Widzinski et al.; the disclosures of which are incorporated herein.

FIELD OF THE INVENTION

This invention generally relates to increased accuracy of disperse security marker authentication. It is specifically concerned with security markers applied at very low levels to objects which, when excited with light of appropriate wavelengths, emit radiation which produce a unique image, for authenticating and identifying the object. When detecting intended markers at extremely low levels, cross talk from unintended materials with radically different emission profiles can be observed. Generally, the signals from these unintended materials are observed as localized areas of high density emission points. These features are used to discriminate signals from intended markers versus signals arising from unintended materials.

BACKGROUND OF THE INVENTION

If goods are not genuine, then product counterfeiting has occurred. If goods have been diverted from their intended channel of commerce, then the goods have been subject to product diversion.

Product counterfeiting occurs on artworks, CDs, DVDs, software recorded on CDs, fragrances, designer clothes, handbags, briefcases, automobile and airplane parts, securities, identification cards (driver's licenses, passports, visas, green cards), credit cards, smart cards, and pharmaceuticals. According to the World Health Organization, more than 7% of the world's pharmaceuticals are counterfeit. This percentage is higher in some countries, such as Colombia, where up to 40% of all medications are believed to be counterfeit. Until recently, the percentage of unauthorized medications in the United States has been virtually negligible due to a tightly controlled regulatory system that has made it extraordinarily difficult for counterfeiters to sell or distribute counterfeit medications. However, the recent explosion of internet drug sales from other countries and increasingly sophisticated counterfeiting techniques have substantially increased the amount of fraudulent drugs entering the United States.

Product diversion has also occurred on many of the aforementioned goods. Such diversion could result in the distribution and sale of goods which do not comply with the product specifications required in the markets where they are sold. For example, motorcycles intended to be sold without catalytic converters in a region with lower air pollution standards might be diverted to a region which does require such catalytic converters. Other negative effects include price inequities in certain markets, loss of exclusivity by some manufacturers or distributors, and damage to the goodwill, patent rights, and trademark rights of the manufacturer. Such diverted goods are sometimes referred to as "gray market" goods. Since the goods are genuine, it is sometimes difficult to determine whether the goods have been improperly diverted. This is especially true for a variety of goods such as, for example clothing, pharmaceuticals and cosmetics.

The application of security markers to an object or product for authenticating the origin and intended market of the object product are known in the prior art. These security markers can be incorporated into components which make up the object or can be incorporated into papers, inks or varnishes that are applied to the object or into to labels affixed to the object or packaging for the object. The presence of security markers verifies the authentic origin of the object and is verified by means suited to the particular nature of the marker.

Non-destructive detection of security markers via characteristic emission capture on an image sensor during or following marker excitation is also known in the prior art. A special case is presented in WO 2010/071673 A1 discussing detection techniques as a function of security marker particle size. While preferred marker-detector systems work well for these purposes, materials other than the intended security marker, including materials not intended as a security markers, may emit low intensity radiation across a broad spectrum. Generally, the interfering emission will differ from intended marker emission patterns with respect to spatial distribution.

SUMMARY OF THE INVENTION

Briefly, according to one aspect of the present invention an image erosion process followed by a comparison against original to generate a single erosion ratio value is utilized. That value will be compared to a predetermined threshold and the comparison result will be one of several criteria used to authenticate or reject an object. In particular, a preferred marker is applied in such a way that emission is detected as small dots of low spatial density. When an erosion process is applied, a very high proportion of initially illuminated pixels are eroded, or turned off. Illuminated pixels after erosion compared to those initially illuminated are much less than 50%, and preferably less than 20%. Unintended marker cross talk emanating from high spatial printing density regions will not erode in a similar manner. These higher spatial density marks will result in a high fraction of illuminated pixels after erosion and consequently will fail the erosion threshold comparison test. Any single criterion failure will result in global rejection of the object under scrutiny.

The invention and its objects and advantages will become more apparent in the detailed description of the preferred embodiment presented below.

BRIEF DESCRIPTION OF THE DRAWINGS

FIG. 5 is a representation of a two small pixel arrays with the pixel of interest in bold underline. Status of neighboring pixels (on or off) will dictate whether the pixel of interest remains on (illuminated) or is eroded to off. In this figure, the left hand array is pre-erosion and the right hand is post-erosion.

FIG. 6 is a representation of two small pixel arrays with the pixel of interest in bold underline. In this case, all neighboring pixels are on in the left hand pre-erosion array, so the pixel of interest remains illuminated in the right hand post-erosion array.

DETAILED DESCRIPTION OF THE INVENTION

Figure 1:
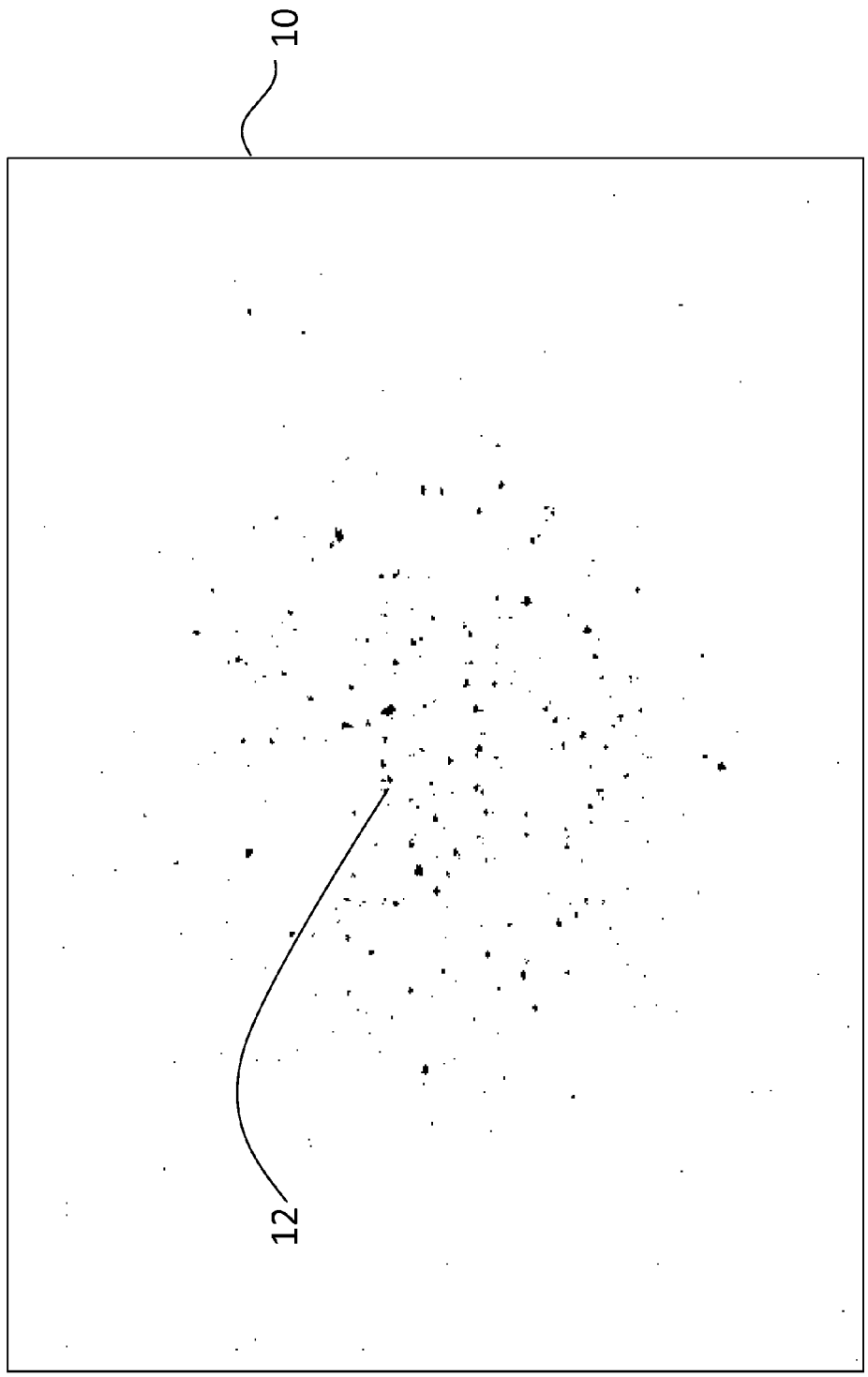
FIG. 1 is a typical marker emission image and provides visual reference for the concept of small dots with low spatial density of emission image pixels

The present invention will be directed in particular to elements forming part of, or in cooperation more directly with the apparatus in accordance with the present invention. It is to be understood that elements not specifically shown or described may take various forms well known to those skilled in the art. Referring now to FIG. 1 which is an emission image 10, emanating from marker on an object with preferred spatial density and pixel intensity. One can see that the points of emission 12, are reasonably uniformly distributed and centered in the image. Also apparent is the relatively small signal spatial area represented by a single dot. As a potential screening pass criterion, an erosion process could be performed on the initial emission image whereby the resultant image would present a small fraction of the original illuminated pixels in a sustained illuminated state. One such process is described below.

Figure 5:
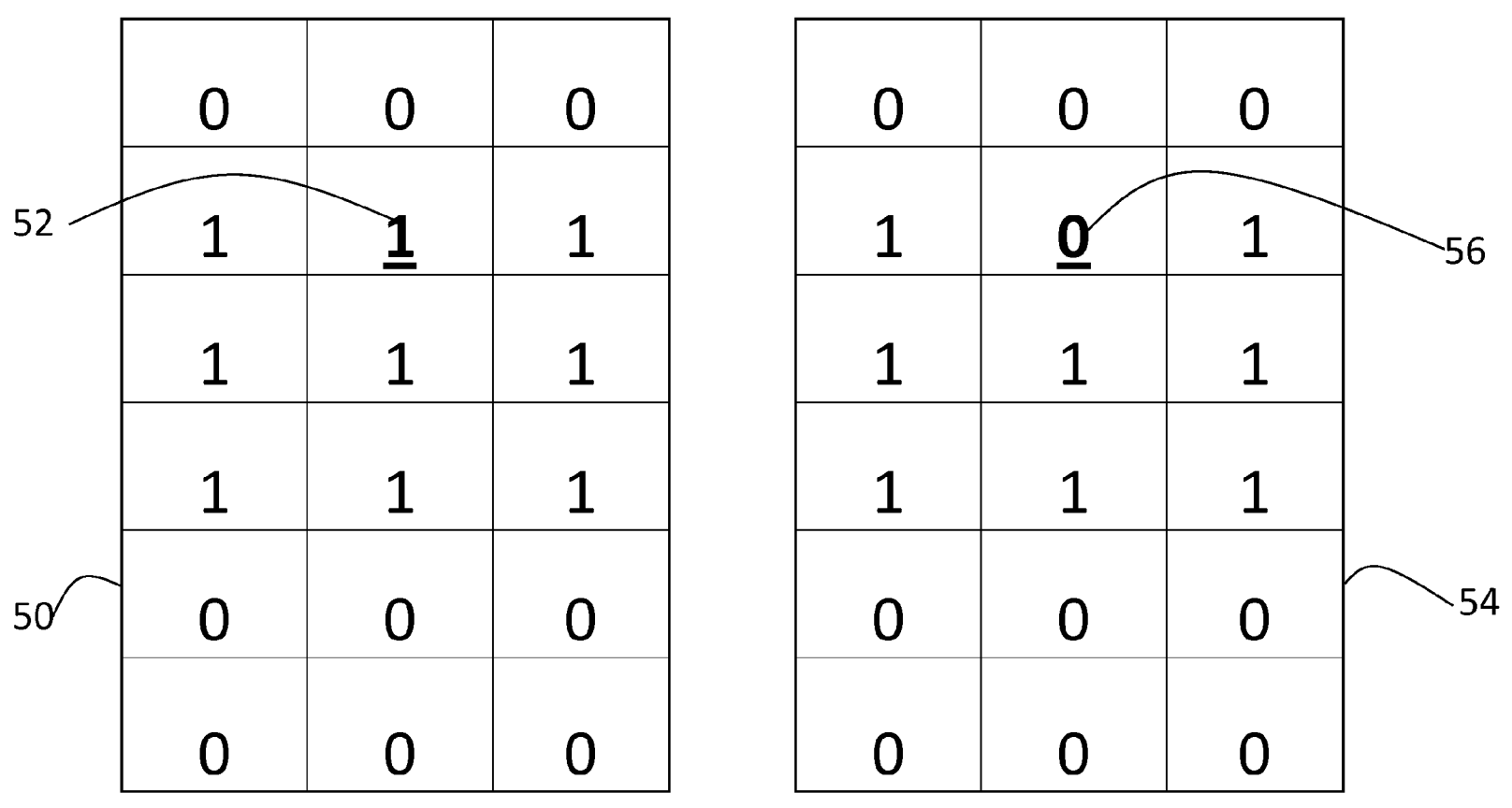
Figure 6:
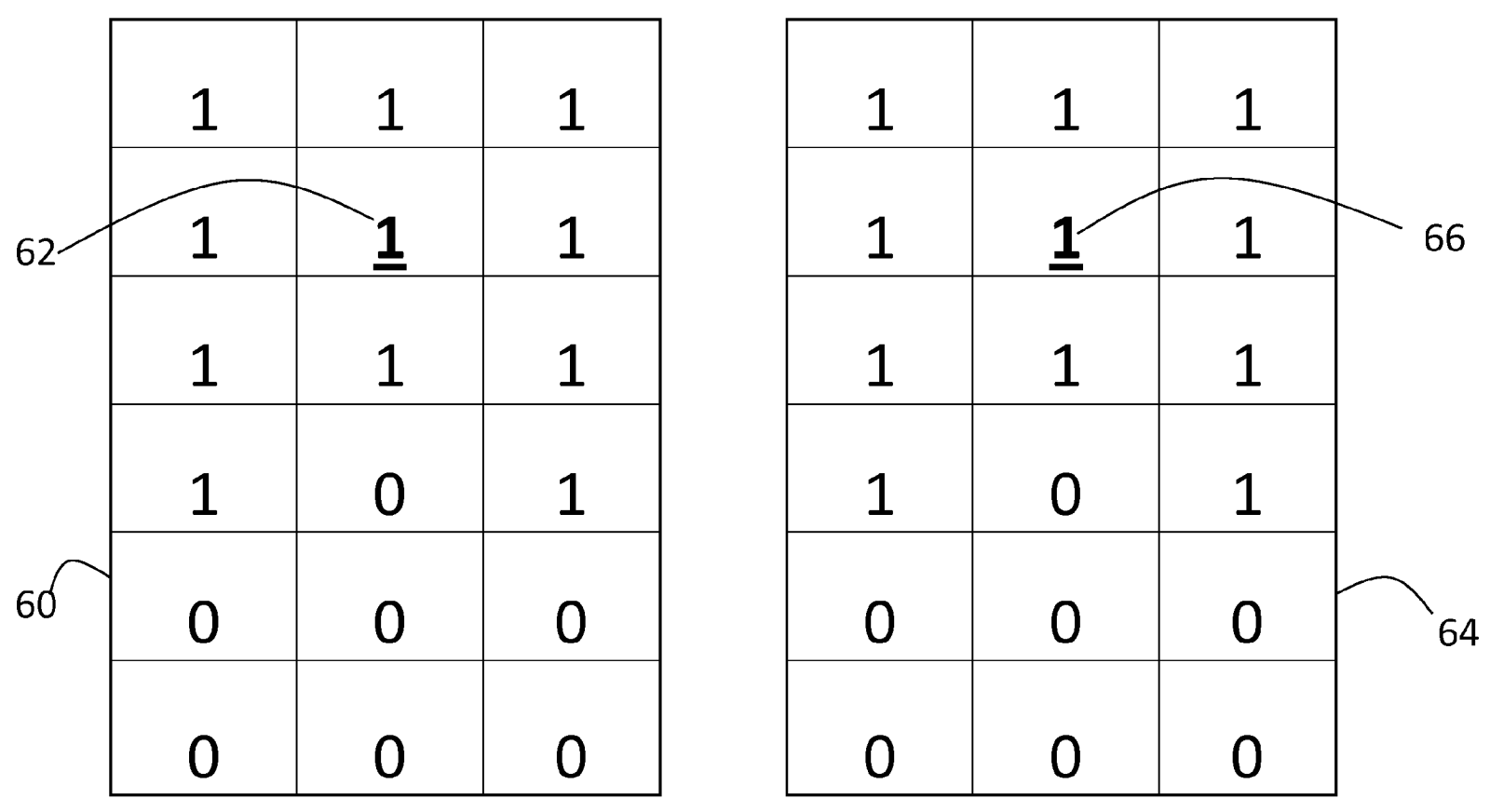

Referring now to FIG. 5, examine the pixel array 50 containing the pixel of interest 52, shown in bold-underline and represented with a numeral 1 thus indicating an illuminated condition. As the eight neighbors surrounding the pixel of interest are examined, three pixels that are 0, or off are seen. If any one neighbor is off, then the pixel of interest is eroded to an off condition in the output image according to the invention's erosion strategy. In the accompanying pixel array 54, the pixel of interest 56 has been eroded and is represented with a bold-underlined 0. This pixel will be off in the resultant image. In the case of FIG. 6, the pixel of interest 62 in pixel array 60 is completely surrounded by illuminated pixels and therefore would not be eroded. Pixel array 64 reflects the constancy of state for pixel of interest 66.

Figure 3:
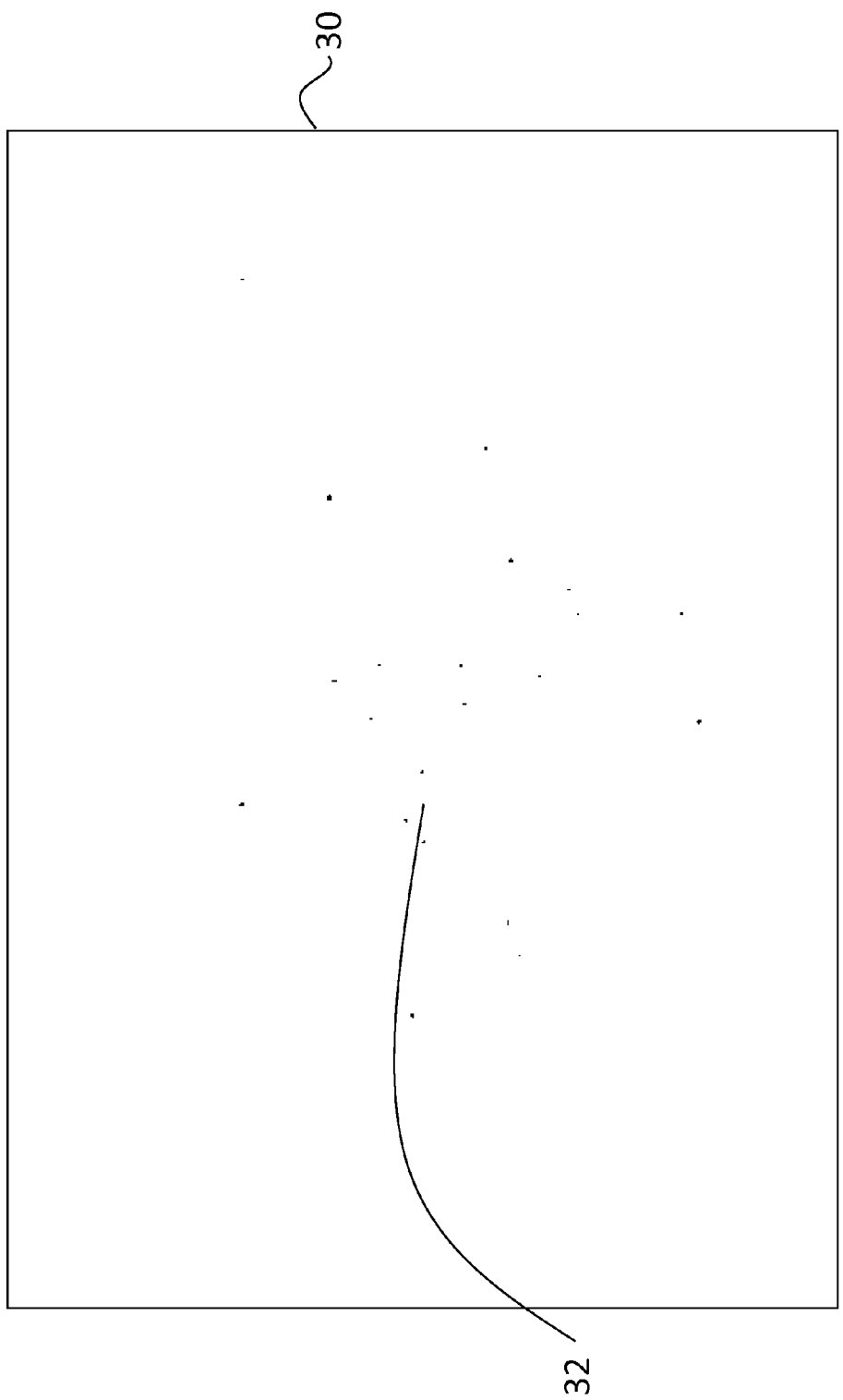
FIG. 3 is a typical marker emission image after an erosion process has transpired.

This process of assessment and erosion is repeated throughout the entire pixel array and a new resultant image is created that reflects the effect of the erosion strategy. FIG. 3 is an image frame 30 that is the result of the described erosion process applied to image 10 in FIG. 1. As a consequence, very low spatial frequency dots 32 with very small dot size are observed. A ratio of pixel counts from FIG. 3 over those observed in FIG. 1 is calculated and that resulting fraction is compared to a previously determined value. If the calculated ratio is less than the pre-determined value, then a pass condition exists.

Figure 2:
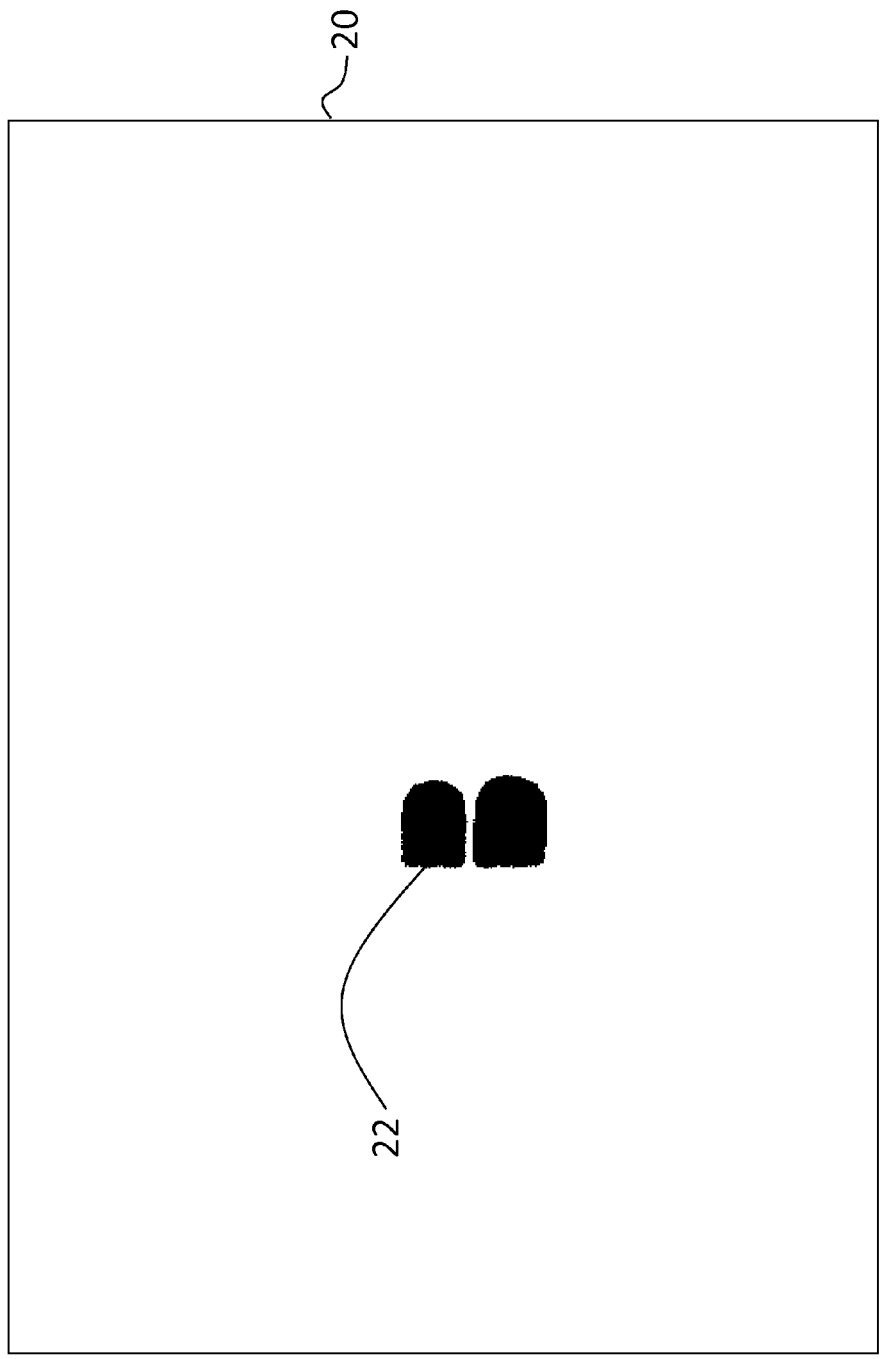
FIG. 2 is an a typical marker emission image and provides visual reference for the idea of large dots with a high spatial density of emission image pixels.
Figure 4:
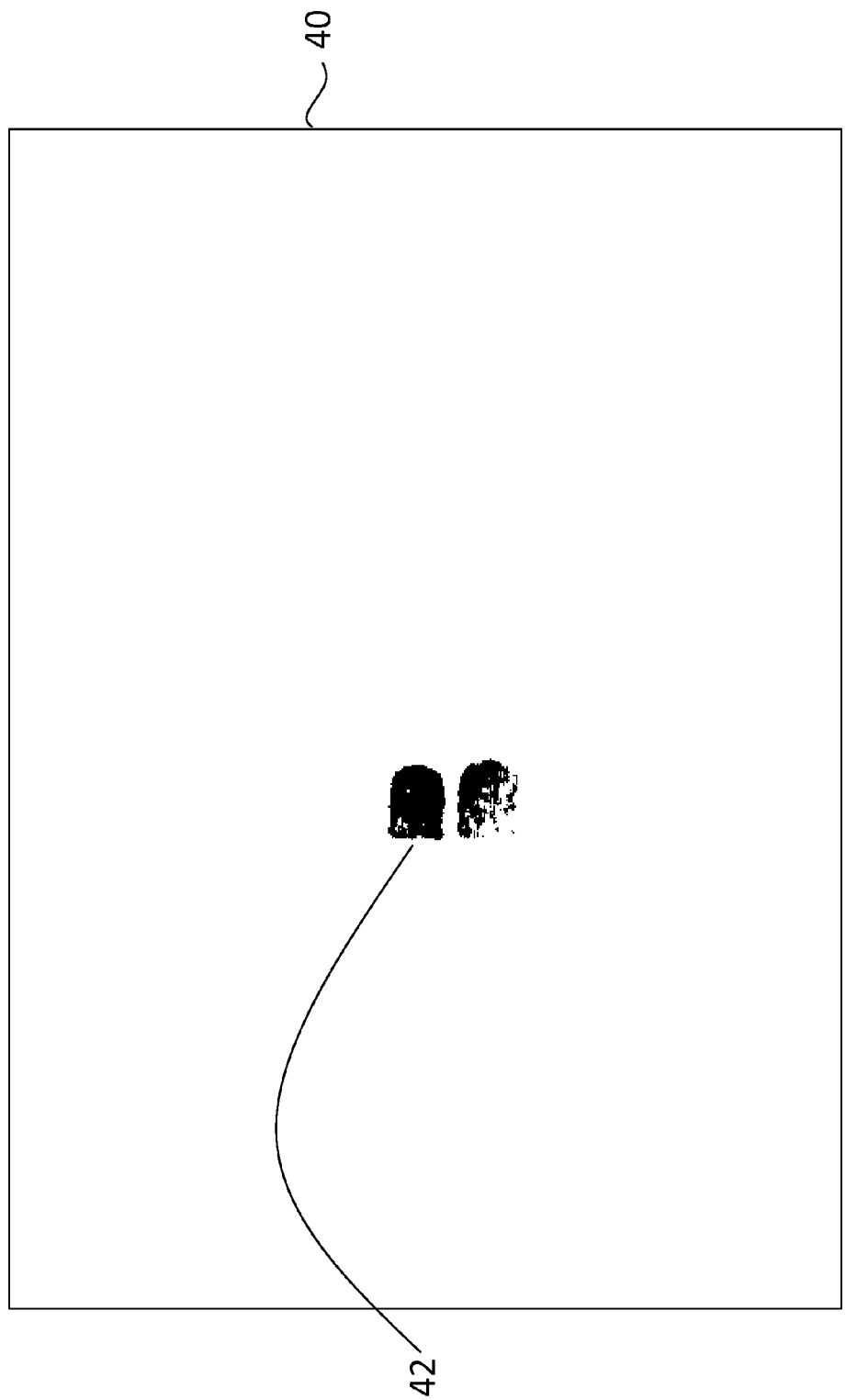
FIG. 4 is an a typical marker emission image after an erosion process has transpired.

Referring now to FIG. 2 image 20, one observes large dots with a highly localized spatial density of image pixels 22. Density is so high in fact that the particles appear to paint a solid shape. Applying the invention's erosion strategy to the FIG. 2 image, a resultant image, FIG. 4 with image frame 40 is presented. Post erosion emission dots 42 with high spatial density are observed in this frame. Calculating the pixel score ratio of illuminated pixels in FIG. 4 over illuminated pixels in FIG. 2, one can easily see that >50% of the original illuminated pixels remain in an illuminated state (image 40). In this case, the erosion ratio is much higher than the pre-set value, preferably 20%, resulting in a fail condition.

Figure 7:
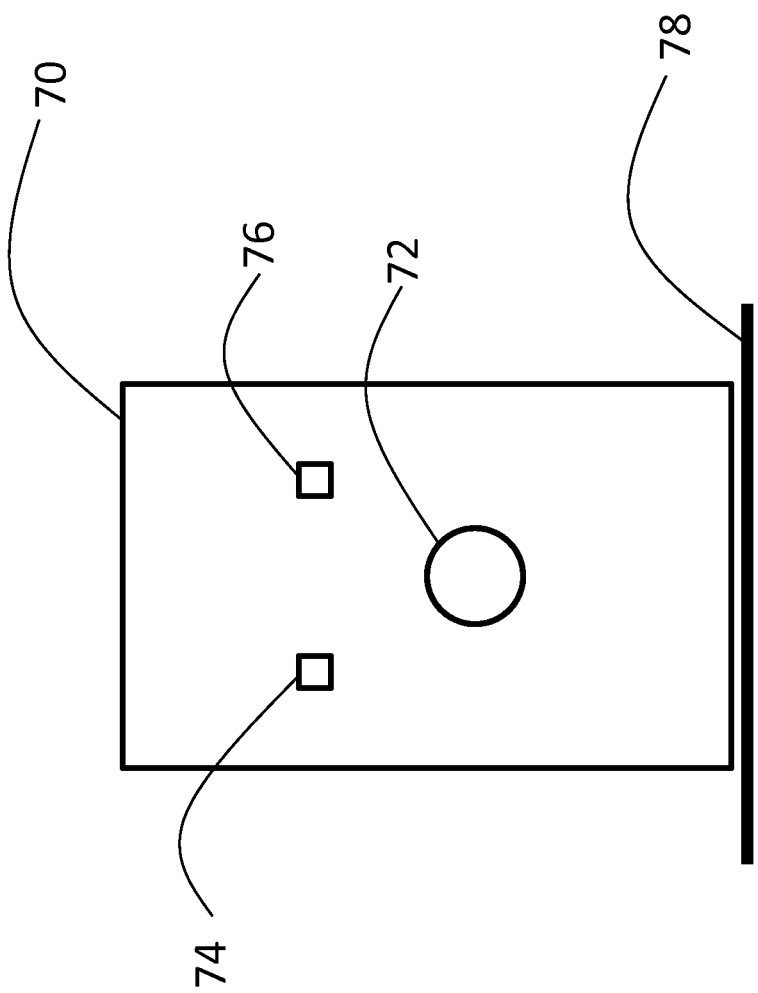
FIG. 7 is a self contained hand held reading device capable of reading, interpreting and indication of pass or fail.
Figure 8:
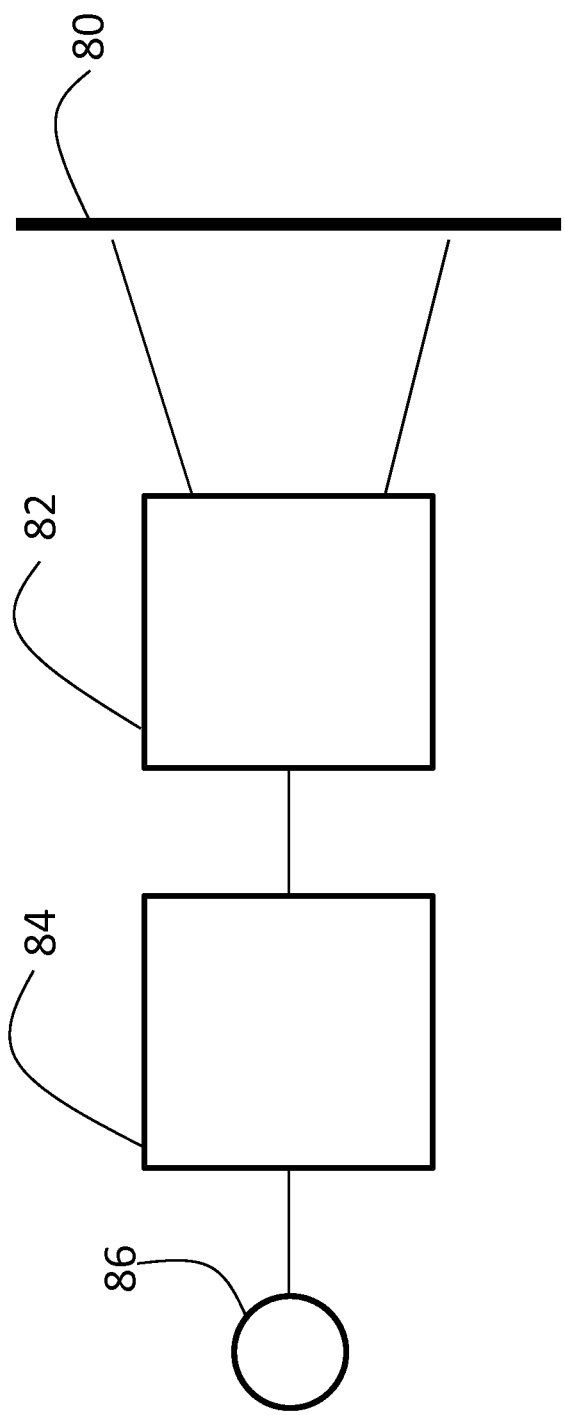
FIG. 8 are sub modules contained within the hand held reading device illustrated in FIG. 7.

All image acquisitions, processing, comparisons and status indications are conducted and indicated within the handheld reading device illustrated in FIG. 7. This device includes a read actuation button 72, a pass indicating LED 74, a fail indicating LED 76 and reads the target 78. Subcomponents in FIG. 8 are contained in the reading device 70. These subcomponents include the reading target or marked item 80, a camera module 82, a processor and memory module 84 and a pass indicator 86. This system has been described in prior art, specifically WO 2010/071673 A1.

The invention has been described in detail with particular reference to certain preferred embodiments thereof, but it will be understood that variations and modifications can be effected within the scope of the invention.

PARTS LIST

10 image
12 points of emission
20 image
22 image pixel
30 image frame
32 spatial frequency dot
40 image frame
42 post erosion emission dots
50 pixel array
52 pixel of interest
54 pixel array
56 pixel of interest
60 pixel array
62 pixel of interest
64 pixel array
66 pixel of interest
70 reading device
72 read actuation button
74 pass indication LED
76 fail indication LED
78 target
80 marked item
82 camera module
84 processor and memory module
86 pass indicator

The invention claimed is:

1. A method for detecting authorized security markers comprising:
   capturing an image of a region of interest on a product with a camera;
   storing image data in a two-dimensional array on a microprocessor;
   counting a number of pixels at or above a predetermined brightness level in the image data with the microprocessor to determine a first score;
   eroding the image data;
   counting the pixels which remain at or above the predetermined brightness level after erosion to determine a second score;
   calculating a ratio of the second score to the first score; and
   producing a first authentication signal if the ratio meets a first predetermined criteria.

2. A method as in claim 1 wherein the security marker is authenticated if the marker meets the first predetermined criteria and at least one additional predetermined criteria.

3. A method for detecting authorized security markers comprising:
   capturing an image of a region of interest on a product with a camera;
   storing image data in a two-dimensional array on a microprocessor;

computing the brightness of a number of pixels at or above a predetermined brightness level in the image data with the microprocessor to determine a first score;
eroding the image data;
counting the pixels which remain at or above the predetermined brightness level after erosion to determine a second score;
calculating a ratio of the second score to the first score; and
producing a first authentication signal if the ratio meets a first predetermined criteria.

* * * * *